United States Patent [19]

Nishio et al.

[11] 4,191,155

[45] Mar. 4, 1980

[54] INTERNAL COMBUSTION ENGINE IGNITION NOISE PREVENTING DEVICE

[75] Inventors: Kanemitsu Nishio; Mitsutaka Yoshida; Takashi Suzuki; Junji Sunohara, all of Nagoya, Japan

[73] Assignee: NGK Spark Plug Co., Ltd., Nagoya, Japan

[21] Appl. No.: 852,259

[22] Filed: Nov. 17, 1977

[30] Foreign Application Priority Data

Nov. 25, 1976 [JP] Japan ............................. 51-141439
Dec. 2, 1976 [JP] Japan ............................. 51-145406
Dec. 2, 1976 [JP] Japan ............................. 51-145407
Dec. 2, 1976 [JP] Japan ......................... 51-161974[U]

[51] Int. Cl.² .............................................. F02P 1/00
[52] U.S. Cl. .............................................. 123/148 P
[58] Field of Search ................................... 123/148 P

[56] References Cited

U.S. PATENT DOCUMENTS

| | | | |
|---|---|---|---|
| 1,971,497 | 8/1934 | Miller | 123/148 P |
| 2,180,704 | 11/1939 | Dietrich et al. | 123/148 P |
| 2,238,915 | 4/1941 | Peters et al. | 123/148 P |
| 2,768,227 | 10/1956 | Ruckelshaus | 123/148 P |

*Primary Examiner*—Stuart N. Hecker
*Attorney, Agent, or Firm*—Sughrue, Rothwell, Mion, Zinn and Macpeak

[57] ABSTRACT

An internal combustion engine ignition device comprises a radio noise preventing device for suppressing the capacity discharge current which flows in the low voltage side circuit of an ignition circuit and is generated during the spark discharge of a spark plug in order to prevent the radio noise generated by the ignition system of the internal combustion engine.

6 Claims, 16 Drawing Figures

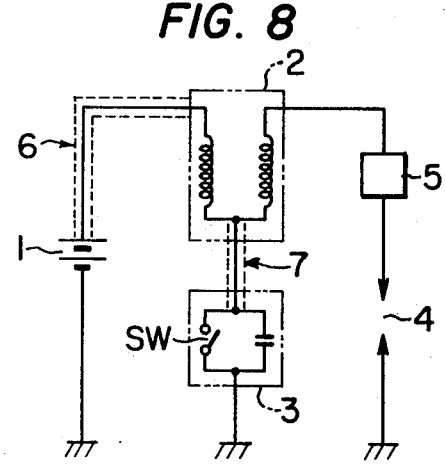
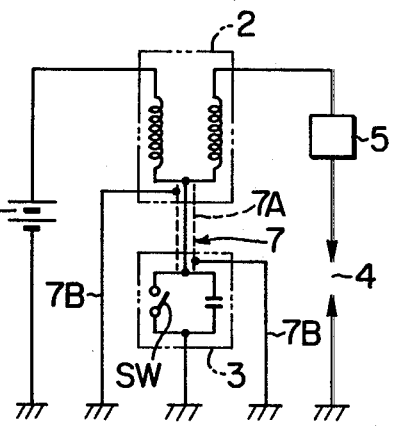
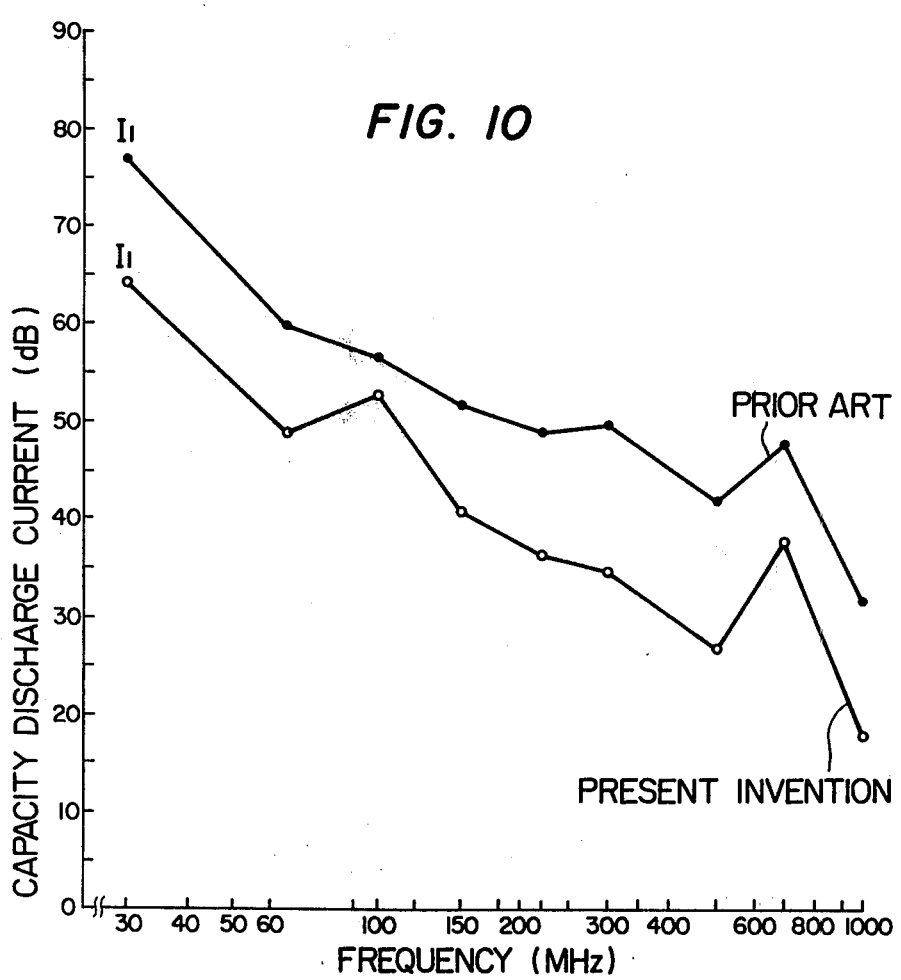

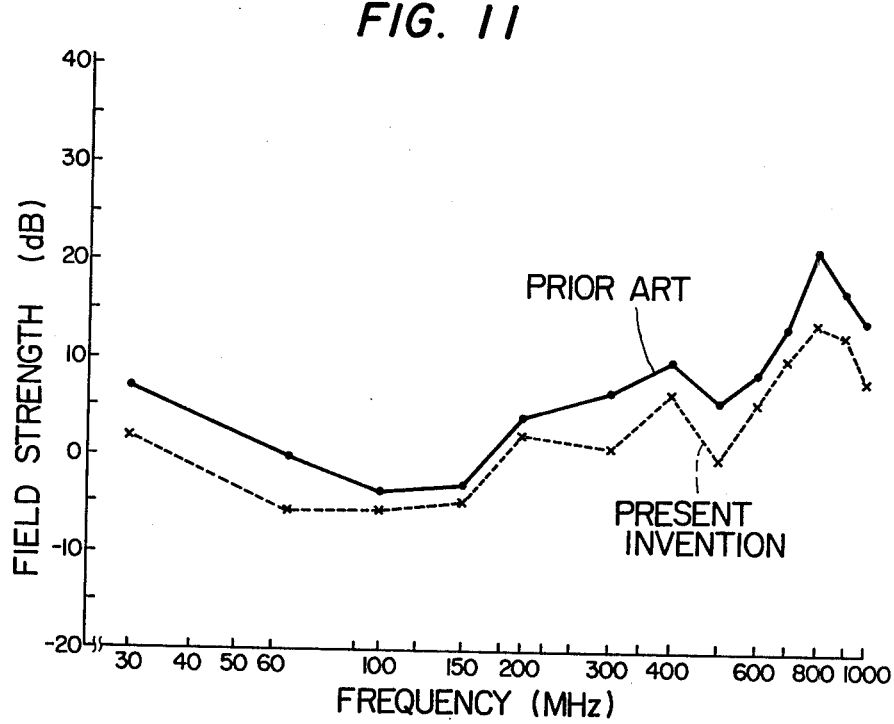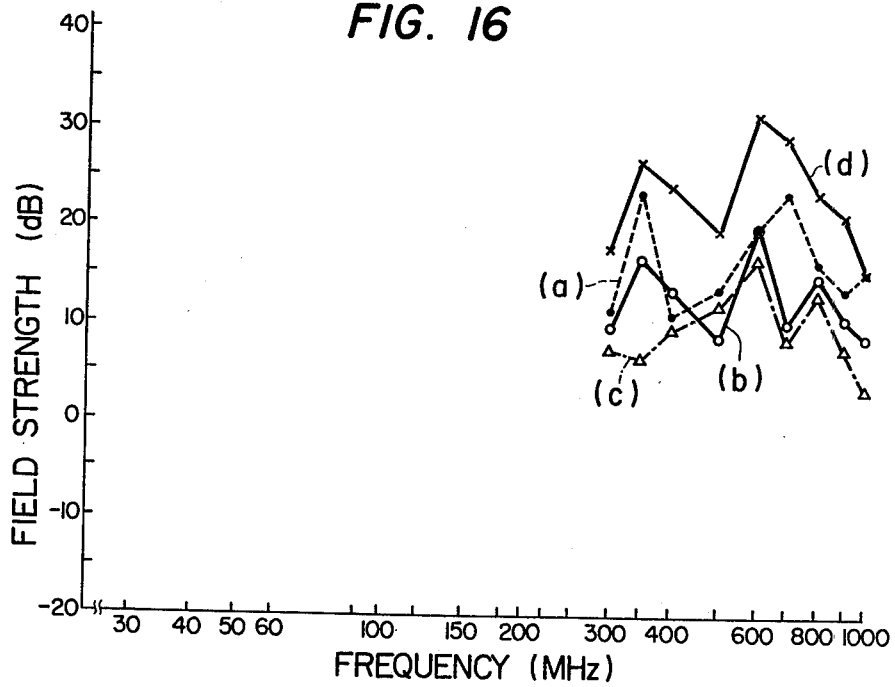

INTERNAL COMBUSTION ENGINE IGNITION NOISE PREVENTING DEVICE

BACKGROUND OF THE INVENTION

This invention relates to internal combustion engines, and more particularly to an internal combustion engine ignition device having a radio noise preventing device in the low voltage side circuit of an ignition circuit thereof.

It has been well known in the art that the main cause for radio noise generated by the ignition system of an internal combustion engine is a capacity discharge current generated during the spark discharge of a spark plug. It has been considered in the art that this capacity discharge current is attributed to the spark discharge of the spark plug, and therefore it has been considered that the capacity discharge current flows in the spark plug side, or the high voltage side of the circuit. Accordingly, a radio noise preventing device for suppressing the capacity discharge current in the high voltage side is provided for the high voltage side only in order to prevent the radio noise. However, it has been found that in the conventional ignition device sometimes the capacity discharge current $I_1$ in the low voltage side circuit becomes larger than the capacity discharge current in the high voltage side circuit. This will be described in detail with reference to FIG. 3.

In conventional ignition circuits shown in FIGS. 1 and 2, the capacity discharge current $I_1$ in a low voltage side circuit comprising a battery 1, the primary side of an ignition coil 2, and an interrupter 3, and the capacity discharge current $I_2$ in a high voltage side circuit comprising a spark plug 4 connected to the secondary side of the ignition coil 2 were measured by using different noise preventing devices 5 in the high voltage side circuit with the following results: In FIG. 3, reference character (a) indicates the case where an ordinary spark plug was employed without using a noise preventing device as shown in FIG. 1, and reference characters (b) through (e) indicate the cases where a spark plug with a 1 KΩ resistor, a spark plug with a 5 KΩ resistor, a spark plug with a 5 KΩ resistor and a cap with a 5 KΩ resistor, and a 5 KΩ winding shield cap and a spark plug with a 5 KΩ resistor were employed as shown in FIG. 2, respectively. The measurement values of the capacity discharge currents $I_1$ and $I_2$ in the various cases described above are as indicated in FIG. 3. As is apparent from the graph shown in FIG. 3, in the case where the resistance value of the high voltage side noise preventing device is changed or a noise preventing device having an inductive component is provided in the circuit, (1) the low voltage side current $I_1$ decreases in proportion to the value of the resistor series-connected to the high voltage side if the value is within approximately one KΩ; however, it does not decrease further even if the value of the resistor is increased. Furthermore, (2) in the case where an excellent noise preventing device is connected to the high voltage side, the value of the current $I_1$ tends to become larger than the value of the high voltage side current $I_2$. Thus, even if the noise preventing device is provided in the high voltage side as in the conventional method, it is impossible to obtain a satisfactory noise preventing effect when the current $I_1$ becomes larger than the current $I_2$.

SUMMARY OF THE INVENTION

Accordingly, it is an object of this invention to eliminate all of the above-described difficulties accompanying a conventional ignition device.

More specifically, an object of the invention is to provide an internal combustion engine ignition device in which even when the capacity discharge current in the low voltage side circuit of an ignition circuit becomes larger than the capacity discharge current in the high voltage side circuit thereof, a satisfactory noise preventing effect can be obtained by providing a radio noise preventing device in the low voltage side circuit.

This invention resides in that in an internal combustion engine ignition device comprising a low voltage side circuit essentially having a low voltage supply such as a battery, and the primary side of an ignition coil and an interrupter connected in series to the low voltage supply, and a high voltage circuit including a circuit adapted to suppress a capacity discharge current by connecting an ordinary spark plug or a spark plug with a resistor to the output terminal of the secondary side of the ignition coil, or connecting a plug cap with an inductor to the output terminal if necessary, the capacity discharge current is suppressed by connecting an inductor in series with the ignition coil in the low voltage side circuit, or further connecting a capacitor in parallel to the ignition coil, or furthermore electrically shielding a lead wire which is connected between the battery and the primary side of the ignition coil or between the ignition coil and the interrupter in the case where the capacity discharge current $I_1$ in the low voltage side circuit becomes larger than the capacity discharge current $I_2$ in the high voltage side circuit.

BRIEF DESCRIPTION OF THE DRAWINGS

FIGS. 4 through 9 are electrical circuit diagrams showing various concrete examples of an ignition circuit employed in an internal combustion engine ignition device according to this invention.

FIG. 10 is a graphical representation indicating the measurement results of the low voltage side capacity discharge currents of the ignition circuit shown in FIG. 4 and of the conventional ignition circuit.

FIG. 11 is a graphical representation indicating the measurement results of the radiation electric field strengths of the ignition circuit shown in FIG. 4 and of the conventional ignition circuit.

FIG. 16 is a graphical representation indicating the measurement results of the radiation electric field strengths of the ignition circuit shown in FIG. 9 and of the conventional ignition circuit.

DETAILED DESCRIPTION OF THE PREFERRED EMBODIMENTS

Concrete examples of the device according to this invention in which the capacity discharge current allowed to flow in the low voltage side circuit is suppressed will be described with reference to FIGS. 4 through 9.

Figures 1, 2:
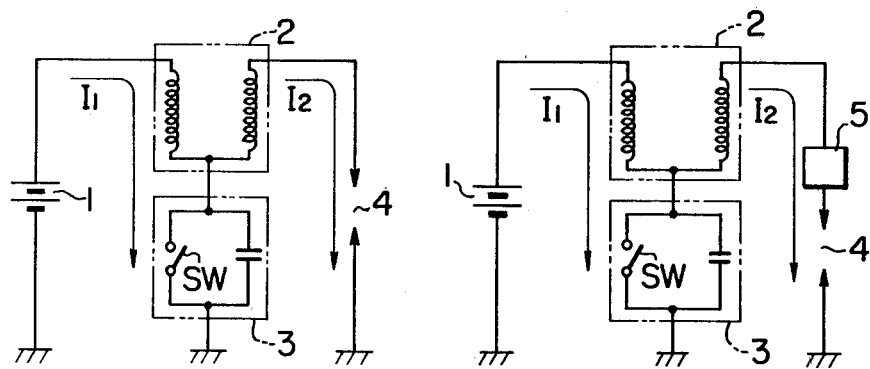
FIGS. 1 and 2 are electrical circuit diagrams illustrating ignition circuits employed in conventional ignition devices.
Figure 3:
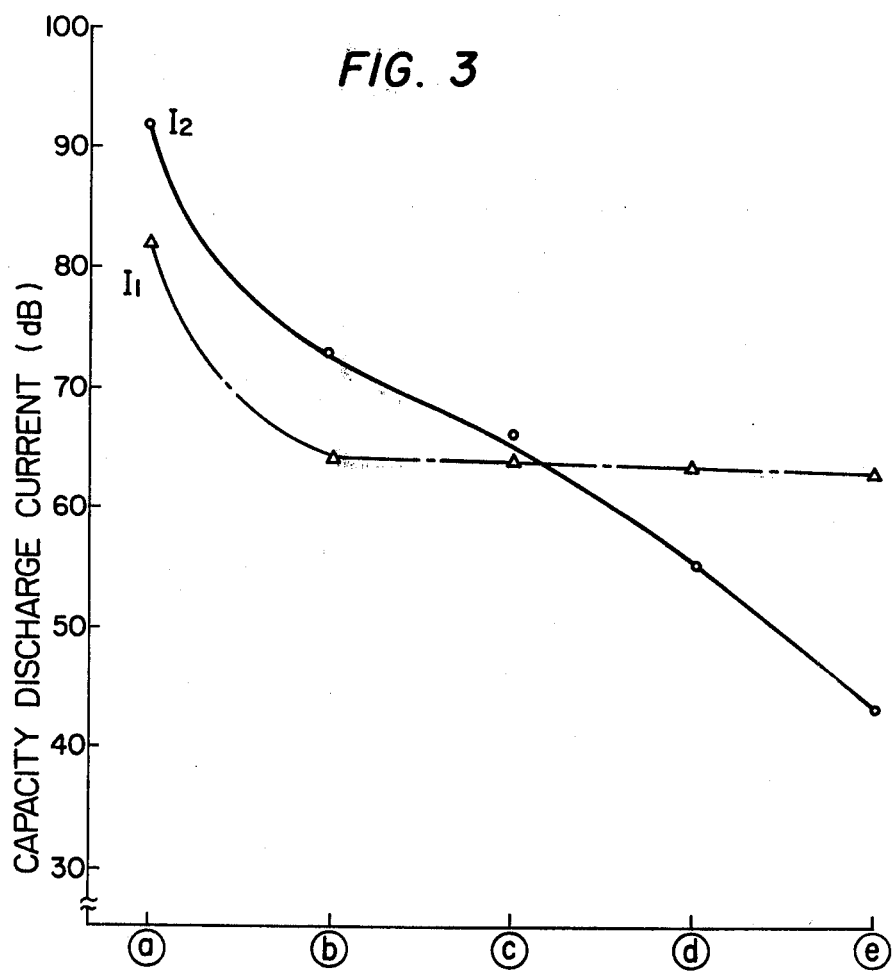
FIG. 3, consisting of a–e, is a graphical representation indicating relationships between a low voltage side capacity discharge current $I_1$ and a high voltage side capacity current $I_2$ in the conventional ignition circuits shown in FIGS. 1 and 2.
Figure 4:
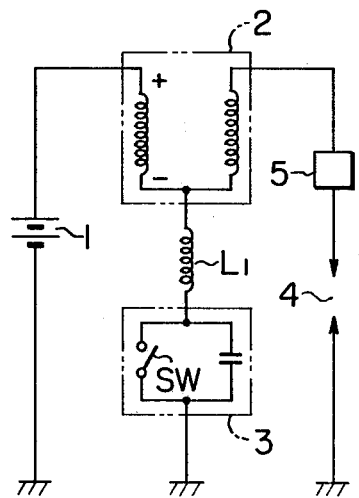

The circuit shown in FIG. 4 is obtained by series-connecting an inductor $L_1$ having an inductance of 0.5–500 $\mu H$, preferably 5–500 $\mu H$, between the negative terminal of the ignition coil 2 of the conventional ignition circuit shown in FIG. 2 and the interrupter 3 of the same.

Figure 5:
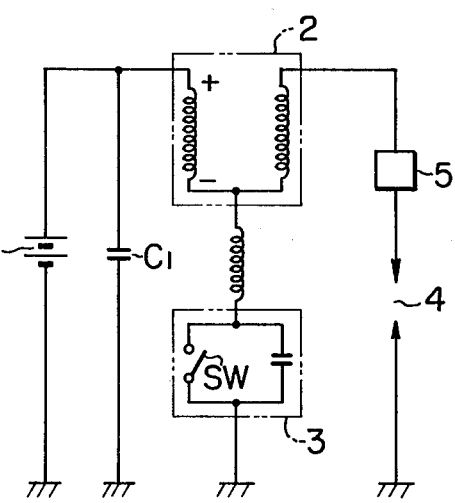

The circuit shown in FIG. 5 is obtained by modifying the circuit shown in FIG. 4. In other words, a capacitor $C_1$ is connected across the battery 1 shown in FIG. 4.

Figure 6:
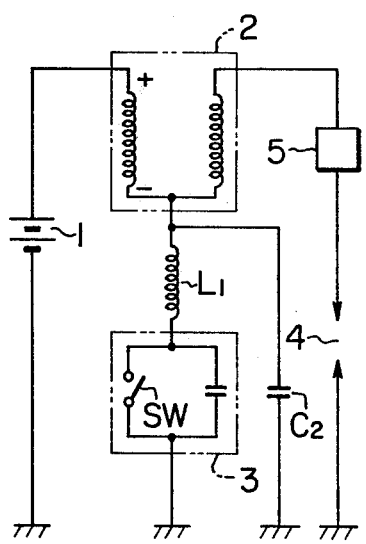

The circuit shown in FIG. 6 is also obtained by modifying the circuit shown in FIG. 4. More specifically, a capacitor $C_2$ of 0.001–0.2 $\mu F$ is parallel-connected to be series circuit of the inductor $L_1$ and the interrupter 3 shown in FIG. 4.

Figure 7:
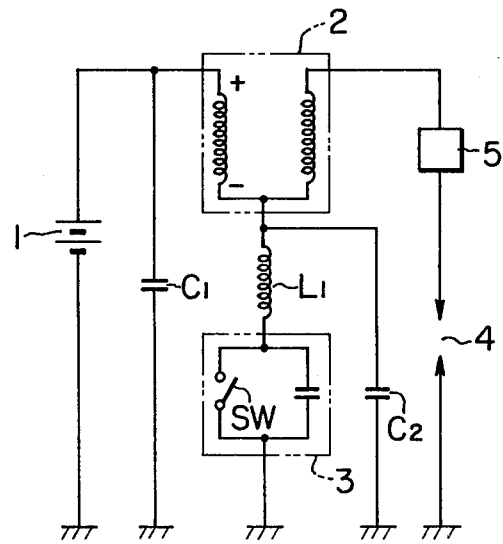

In the circuit shown in FIG. 7, the aforementioned capacitors $C_1$ and $C_2$ are provided in the circuit shown in FIG. 4. More specifically, the circuit shown in FIG. 7 is obtained by shunting the battery 1 in FIG. 4 with the capacitor $C_1$ and by shunting the interrupter 3 in FIG. 4 with the capacitor $C_2$.

The circuit shown in FIG. 8 is obtained by modifying the conventional ignition circuit shown in FIG. 2. More specifically, the battery 1 is connected through a shield wire 6 to the primary side positive terminal of the ignition coil 2, while the negative terminal of the ignition coil 2 is connected through a shield wire to the interrupter 3.

An effect of preventing radio noise can be sufficiently obtained by employing the shield wire as in the ignition circuit shown in FIG. 8. The radio noise preventing effect can be markedly improved by grounding the outer shielding sheath of the shield wire. One concrete example of this method is shown in FIG. 9, in which the ignition coil 2 of the conventional ignition circuit shown in FIG. 2 is connected to the interrupter 3 of the same through a shield wire 7 the outer shielding sheath 7A of which is connected to the ground 7B.

The effects of this invention will be described by comparing the concrete examples thereof with the conventional ignition device.

EXAMPLE 1

As shown in FIG. 4, in the low voltage side the inductor $L_1$ having an inductance of 20 $\mu F$, a coil diameter of 8 mm, 100 in the number of turns and a length of 500 mm was series-connected between the negative terminal of the ignition coil 2 and the interrupter 3, while in the high voltage side a spark plug 4 with a 5 $K\Omega$ resistor was connected to a 5 $K\Omega$ winding shield cap. As a comparative example, the same circuit with no noise preventing device provided on the low voltage was constructed. In these two cases, the low voltage side capacity discharge currents were measured, and the measurement data are as indicated in a graph shown in FIG. 10. Furthermore, radiation measurements were made using a general purpose 4-cycle engine having a capacity of 180 cc as a load. A model NM 37/57 noise electric field strength measuring instrument manufactured by Singer Co. was used to measure radiation electric field strengths according to S.A.E. standard J551d. The radiation measurement data are as indicated in a graph shown in FIG. 11. As in apparent from these graphs, it is possible to reduce the magnitude of radio noise over a wide range of frequency.

EXAMPLE 2

Figure 12:
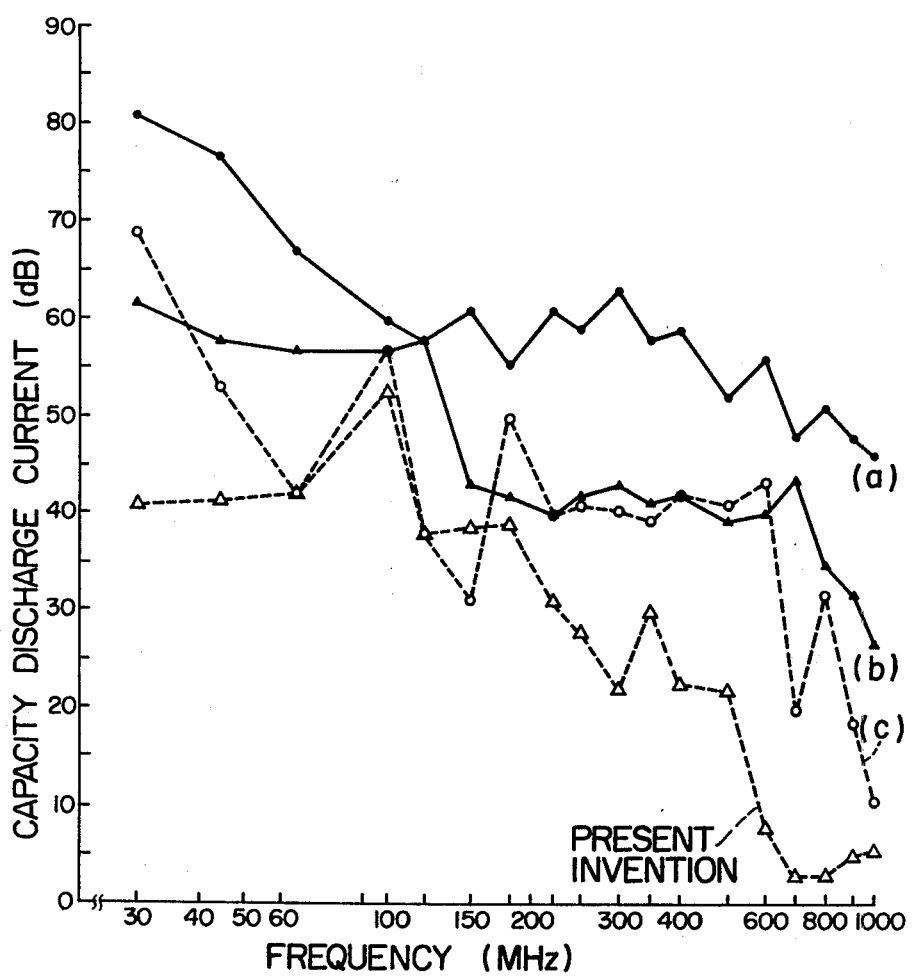
FIG. 12, consisting of a–c, is a graphical representation indicating the measurement results of the high voltage side capacity discharge currents of the ignition circuit shown in FIG. 5 and of the conventional ignition circuit.
Figure 13:
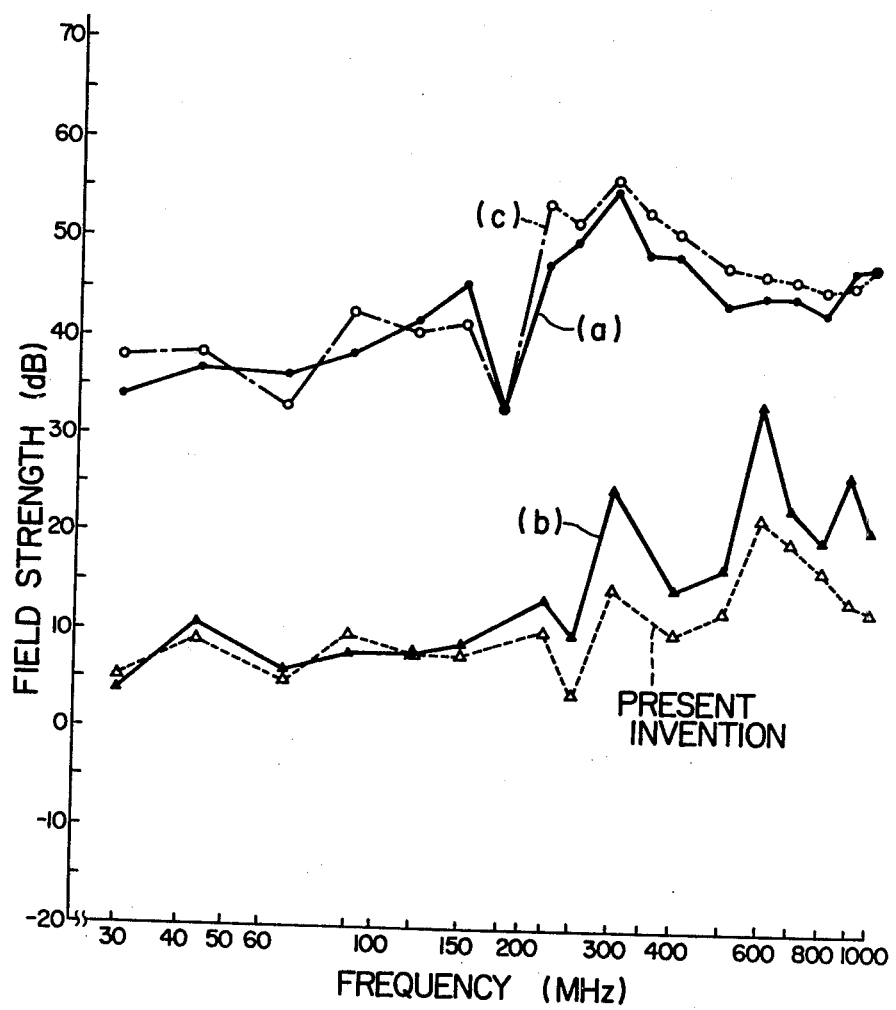
FIG. 13, consisting of a–c is a graphical representation indicating the measurement results of the radiation electric field strengths of the ignition circuit shown in FIG. 5 and of the conventional ignition circuit.

As shown in FIG. 5, in the low voltage side, the inductor $L_1$ having an inductance of 10 $\mu H$ was series-connected between the negative terminal of the ignition coil 2 and the interrupter 3, while in the high voltage side, the spark plug 4 with the 5 $K\Omega$ resistor was connected to a 5 $K\Omega$ winding shield cap. Furthermore, in the low voltage side, a capacitor $C_1$ having a capacitance of 0.1 $\mu F$ was connected in parallel to the series connection of the ignition coil 2, the inductor $L_1$ and the interrupter 3. As comparative examples, (a) no noise preventing device was provided on both high and low voltage sides, (b) no noise preventing device was provided on the low voltage side and (c) no noise preventing device was provided on the high voltage side. In these four cases, the low voltage side capacity discharge currents were measured and the measurement data are as indicated in a graph shown in FIG. 12. Furthermore, radiation measurements were made with the general purpose 4-cycle engine having a capacity of 180 cc used as the load, and the model NM 37/57 noise electric field strength measuring instrument manufactured by Singer Co. was used to measure radiation electric field strengths according to S.A.E. standard J551d. The measurement data are as indicated in a graph shown in FIG. 13. As is apparent from the graph shown in FIG. 13, there were no significant differences between the circuit (c) in which no noise preventing device was provided on the high voltage side and the circuit (b) in which the noise preventing device was provided for the high voltage side but not for the low voltage side, at a frequency range of 200 to 600 MHz; however, outside of the above frequency range, the low voltage side capacity discharge current was reduced. In addition, in case of comparing the conventional circuit with the circuit according to the present invention, in which the noise preventing devices were provided in both high and low voltage sides, there was a remarkable difference therebetween. As to the radiation electric field strength, it is clear from the graph in FIG. 13 that, at a relatively high frequency range higher than 150 MHz, the radiation electric field strength was decreased and the noise prevention effect was improved in the circuit according to this invention in which the noise preventing devices were provided for both the high and low voltage sides, when compared with the circuit in which the noise preventing device was provided on the high voltage side only.

EXAMPLE 3

Figure 14:
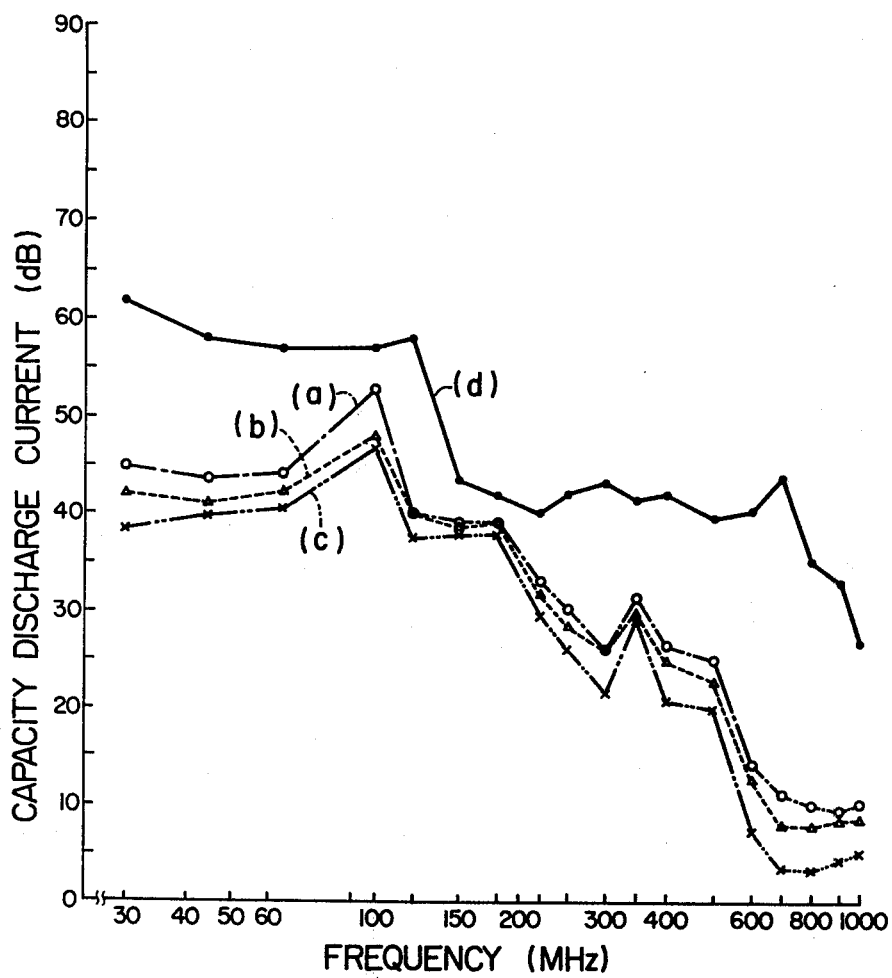
FIG. 14, consisting of a–d, is a graphical representation indicating the measurement results of the low voltage side capacity discharge currents of the ignition circuit shown in FIGS. 6 and 7 and of the conventional ignition circuit.
Figure 15:
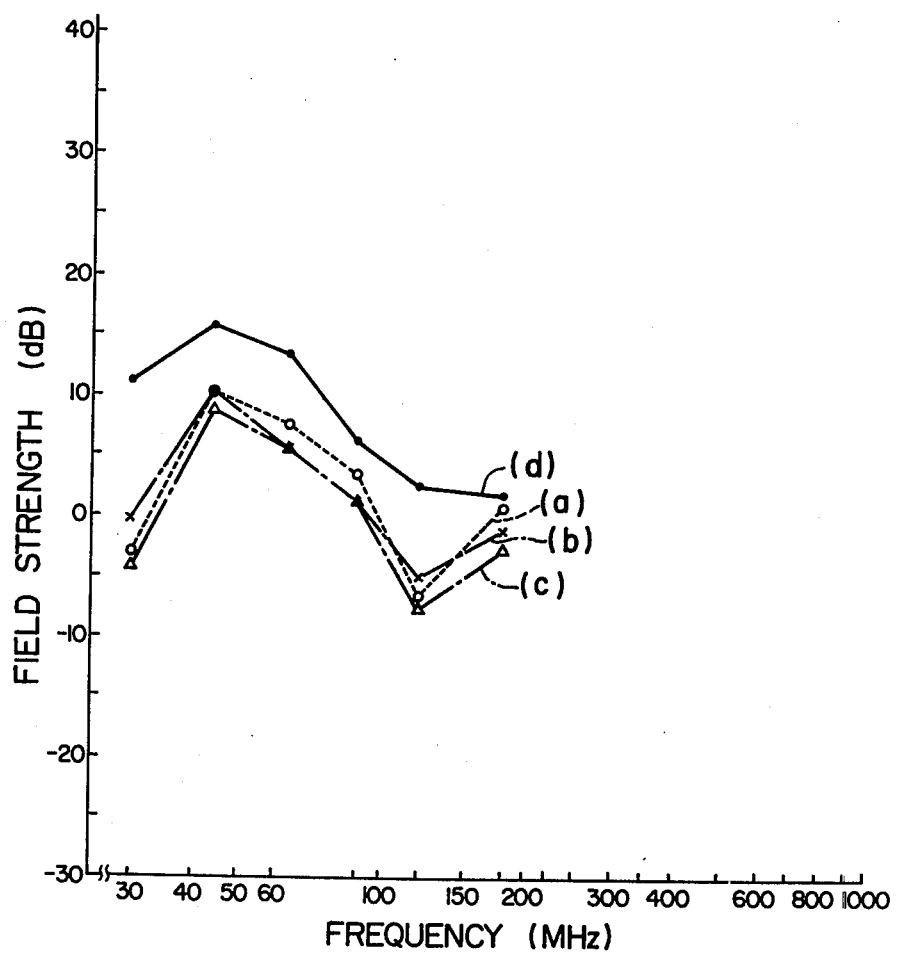
FIG. 15, consisting of a–d, is a graphical representation indicating the measurement results of the radiation electric field strengths of the ignition circuit shown in FIGS. 6 and 7 and of the conventional ignition circuit.

As shown in FIG. 6, in the low voltage side, the inductor $L_1$ was series-connected between the negative terminal of the ignition coil 2 and the interrupter 3 and a capacitor $C_2$ was connected in parallel to the series connection of the inductor $L_1$ and the interrupter 3, while in the high voltage side, the spark plug 4 with the 5 K$\Omega$ resistor was connected to the 5 K$\Omega$ winding shield cap. In this construction, (a) values of the inductor $L_1$ and the capacitor $C_2$ were 5 $\mu$H and 0.01 $\mu$F, respectively, and (b) the values thereof were changed to 50 $\mu$H and 0.1 $\mu$F, respectively. Furthermore, as shown in FIG. 7, in the low voltage side, the capacitor $C_1$ was connected in parallel to the series connection of the ignition coil 2, the inductor $L_1$ and the interrupter 3. In this construction, (c) the values of the inductor $L_1$ and the capacitor $C_1$ and $C_2$ were 20 $\mu$H, 0.5 $\mu$F and 0.1 $\mu$F, respectively. In addition (d) no noise preventing device was provided on the low voltage side. In the above four cases, the low voltage side capacity discharge currents were measured and the measurement data are as indicated in a graph shown in FIG. 14. Furthermore, radiation measurements were made with the general purpose 4-cycle engine having a capacity of 180 cc used as the load, and the model NM 37/57 noise electric field strength measuring instrument manufactured by Singer Co. was used to measure radiation electric field strengths according to S.A.E. standard J551d. The measurement data are as indicated in a graph shown in FIG. 15. As is apparent from the graph shown in FIG. 14, the maximum values of low voltage side capacity discharge currents were considerably reduced for various frequencies by the provision of the inductor $L_1$, the capacitors $C_1$ and $C_2$. In addition, it is apparent from the graph shown in FIG. 15 that the radiation electric field strengths were reduced and the radio noise preventing effects were therefore improved by the provision of the inductor $L_1$, the capacitors $C_1$ and $C_2$.

EXAMPLE 4

As shown in FIG. 9, in the low voltage side, the negative terminal of the ignition coil 2 was connected to the interrupter 3 through a shield wire 7, the outer shielding sheath 7A of which was connected to the ground 7B, while in the high voltage side, the spark plug 4 with 5 K$\Omega$ resistor was connected to the 5 K$\Omega$ winding shield cap. In this construction, (a) the outer shielding sheath of the shield wire at the interrupter side was connected to the ground, (b) the outer shielding sheath thereof at the ignition coil was connected to the ground and (c) the outer shielding sheath at the both sides thereof was connected to the ground. In addition, no noise preventing device was provided in the circuit. In these four cases, the general purpose 4-cycle engine having a capacity of 180 cc was used as the load, and the model NM 37/57 noise electric field strength measuring instrument manufactured by Singer Co. was used to measure radiation electric field strengths according to S.A.E. standard J551d. The measurement data are as indicated in a graph shown in FIG. 16. As is apparent from the graph shown in FIG. 16, the radiation electric field strength was decreased and the radio noise preventing effect was improved by connecting the negative terminal of the ignition coil to the interrupter through the shield wire. In addition, by grounding the outer shielding sheaths of the shield wires at the ignition coil side and the interrupter side, the noise preventing effect can be improved more remarkably.

As the ignition device according to this invention is constructed as described above, in the case where the low voltage side capacity discharge current becomes larger than the high voltage side capacity discharge current, the noise preventing effect can be improved by inserting a radio noise preventing device in the low voltage circuit. Furthermore, no high voltage is applied to the low voltage circuit unlike the high voltage circuit, and therefore there is no problem in dielectric strength in the ignition device according to this invention. Accordingly, a means for preventing radio noise can be provided at low cost and with high reliability.

As the values of the inductor and the capacitor are increased, their effects are also increased. However, as these values increase, the voltage generated by the ignition coil is decreased. Therefore, it is preferable to set the value of the inductor $L_1$ to 0.5–500 $\mu$H, the value of the capacitor $C_1$ to 0.1–1 $\mu$F, and the value of the capacitor $C_2$ to 0.001–0.2 $\mu$F.

What is claimed is:

1. In an internal combustion engine ignition device, said ignition device being of the type having a low voltage side circuit including a D.C. power source, the primary of an ignition coil and an interrupter means connected in series with said primary and said D.C. power source, and a high voltage side circuit including the secondary of said ignition coil, a spark plug and a radio noise preventing means for suppressing a capacity discharge current in said high voltage side circuit, the improvement comprising:
   radio noise preventing means in said low voltage side circuit for suppressing a capacity discharge current flowing through said low voltage side circuit, said radio noise preventing means in said low voltage side circuit comprising an inductor connected in series between said primary and said interruptor and a capacitor connected in parallel to the series connection of the inductor and interruptor.

2. An internal combustion engine ignition device as claimed in claim 1, wherein said inductor has an inductance of 0.5 $\mu$H to 500 $\mu$H.

3. An internal combustion engine ignition device as claimed in claim 1, wherein said radio noise preventing means provided in said low voltage side further comprises a second capacitor connected in parallel to said D.C. source.

4. An internal combustion engine ignition device as claimed in claim 3, wherein said second capacitor has a capacitance of 0.1 to 1.0 $\mu$F.

5. An internal combustion engine ignition device as claimed in claim 3, wherein said second and first capacitors have a capacitance of 0.1 to 1.0 $\mu$F and 0.001 to 0.2 $\mu$F, respectively.

6. An internal combustion engine ignition device as claimed in claim 1, wherein said capacitor has a capacitance of 0.001 to 0.2 $\mu$F.

* * * * *